(12) United States Patent
Singer et al.

(10) Patent No.: US 10,030,502 B1
(45) Date of Patent: Jul. 24, 2018

(54) SYSTEM FOR WELL MONITORING

(71) Applicant: Wellntel, Inc., Shorewood, WI (US)

(72) Inventors: Marian J. Singer, Whitefish Bay, WI (US); Nicholas D. Hayes, Shorewood, WI (US); Dale Raymond, Boca Raton, FL (US); Kent A. Tabor, Pewaukee, WI (US); Dan L. Watts, North Aurora, IL (US); Christopher H. Bock, Milwaukee, WI (US)

(73) Assignee: Wellntel, Inc, Shorewood, WI (US)

( * ) Notice: Subject to any disclaimer, the term of this patent is extended or adjusted under 35 U.S.C. 154(b) by 0 days.

(21) Appl. No.: 14/323,520

(22) Filed: Jul. 3, 2014

Related U.S. Application Data (63) Continuation-in-part of application No. 13/931,297, filed on Jun. 28, 2013.

(51) Int. Cl.
| | |
|---|---|
| *E21B 47/04* | (2012.01) |
| *E21B 47/00* | (2012.01) |
| *E21B 47/12* | (2012.01) |
| *G01F 25/00* | (2006.01) |
| *E21B 47/10* | (2012.01) |

(52) U.S. Cl.
CPC ........ *E21B 47/042* (2013.01); *E21B 47/0003* (2013.01); *E21B 47/12* (2013.01); *G01F 25/0061* (2013.01); *E21B 47/101* (2013.01)

(58) Field of Classification Search
CPC ............... E21B 47/042; E21B 47/0007; E21B 47/0008; E21B 47/101; G01F 23/0076; G01F 25/0061; G01F 23/296; G01V 1/44; G01V 1/40; G01H 9/004
USPC .... 340/853.1, 856, 853, 618, 612, 620, 603, 340/539.1, 854.9; 166/370, 372, 68, 105, 166/250.03, 336, 250.01; 702/166, 55; 73/290.8, 152.18, 290 V
See application file for complete search history.

(56) References Cited

U.S. PATENT DOCUMENTS

| | | | |
|---|---|---|---|
| 2004/0004551 A1* | 1/2004 | Early | 340/603 |
| 2004/0163806 A1* | 8/2004 | Hadley | 166/250.03 |
| 2006/0131028 A1* | 6/2006 | Burris et al. | 166/370 |
| 2007/0120704 A1* | 5/2007 | Hudson et al. | 340/854.9 |
| 2008/0317095 A1* | 12/2008 | Hadley et al. | 374/137 |
| 2011/0228637 A1* | 9/2011 | Zamow et al. | 367/35 |
| 2012/0084055 A1* | 4/2012 | Smithson | 702/166 |
| 2014/0002088 A1* | 1/2014 | Hudson et al. | 324/324 |

* cited by examiner

*Primary Examiner* — Mirza Alam
(74) *Attorney, Agent, or Firm* — Andrew C. Landsman; Godfrey & Kahn, S.C.

(57) ABSTRACT

A module gathers information about the level of water in a water well and sends the information to a database. A sensor tracks the level of water in the well, how it changes over time, and the pace of recharge including the rate of water replenishment from the groundwater source. The system can be programmed to send alerts to interested parties when certain thresholds are reached.

21 Claims, 6 Drawing Sheets

SYSTEM FOR WELL MONITORING

CROSS-REFERENCE TO RELATED APPLICATION

This application is a continuation-in-part of U.S. application Ser. No. 13/931,297 filed Jun. 28, 2013, which is based on and claims priority to U.S. Provisional Patent Application No. 61/665,976 filed on Jun. 29, 2012, both of which are incorporated herein by reference in their entirety for all purposes.

FIELD OF THE INVENTION

The present invention relates generally to the field of well water information and devices and methods of retrieving and recording said information. More particularly, the present invention relates to devices and methods of continuously monitoring water level in a well.

BACKGROUND

Many residential homeowners rely on the use of a well to supply water to their home. Likewise, many farmers rely on the use of a well to supply water to irrigate crops or to keep animals hydrated. Private water wells are a common feature in areas where municipal or city water services are unavailable or where surface supplies are not sufficient or accessible. Water wells are commonly used to source groundwater where naturally occurring groundwater exists in spaces between rocks and/or sand. The wells themselves are bore holes either drilled or pressed into or through the ground into which casing pipes, screens, pumps and other water plumbing are installed. Groundwater seeps through openings in the casing pipe called screens. Water can be pumped via these wells, either with an above ground vacuum pump or, where the water is deeper than 30 feet, with a submersed pump that creates upward pressure to move the water to the surface.

A conventional well typically includes a borehole from the surface to a required depth to reach the ground water. A casing pipe is inserted into the borehole and grout is used to seal the space between the casing pipe and the earth. A pump (either submersed or above the ground water surface, depending on depth) is attached to the water pipe for transportation of water from the well to the point of use. The well is capped at the well head on the ground surface with a well cap. Typically, information which may include a service contractor's phone number and a date of service may be recorded on the well cap.

Water well construction (and sometimes site selection or location advisement) is done by a well driller, who takes care to design the well to meet the needs of the people who will use the water. The well driller, in the process of planning and drilling, will determine where there is ample groundwater, and will size the length and diameter of the well and casing pipe and the capacity and location of the pump accordingly. The driller will take special care to know the top elevation and the productivity of the groundwater table. Elevation is often found by measuring down from the well head (top of the well) to the water surface. Productivity of the well is inferred by measuring the elevation of the water and time it takes to return to a resting level after a pumping event has removed water to the well, a process called recovery. Together with elevation and productivity, the final pump selection is made and construction can be completed.

This water information is necessary to determine the well location in relation to the location of a building, a field of crops, or a neighborhood. At also informs the semi-permanent placement of the pump in the well. If the pump is placed too high in the well, it risks running dry and breaking prematurely. If the pump is placed too low in the well, then the owner will pay extra for the energy required to pump water an unnecessary distance. This information is typically only gathered once, however, at the time of construction. The lack of subsequent information gathering sometimes leads to new issues with the well or the pump that could have been prevented if only the well driller or homeowner had such information.

A borehole well may be considered to be healthy as long as sufficient ground water seeps through a screen section of the casing pipe into the column to allow for water to be pumped from the well. This state of balanced supply and demand is called a "safe yield". As is known to those skilled in the art, a borehole well, the water system, and sometimes the pump equipment will not tolerate long periods of an unsafe yield. For example, a submersible pump must be kept submerged under water for proper operation. Failure to keep the pump submerged causes the pump to overheat and fail. Failure of a pump requires the well to be opened by a technician and the pump must be physically retrieved and repaired or replaced. Thus, a previously recognized problem has been that it is difficult to know the water level in the well and how close the pump may be to reaching the unsafe yield point. In a worst-case example, a borehole well will be pumped dry, the pump will fail, and the water table will have been permanently lowered in the area, effectively rendering the well useless. Needless to say, it is desirable to know about water levels in the casing pipe.

Existing methods of determining water table levels include mounting a sensor under the water in the well with wires communicating to the well head, pressure sensors built into the pump, and opening the well head to physically inspect the well with a plumb bob. Various other methods are known which all necessitate physically opening the well head to inspect the water table level.

One unsatisfactory previously recognized approach, in an attempt to solve the problem referred to herein, involves use of an airline to compress air in the casing pipe in an attempt to raise water to the surface, indicating the level. Another unsatisfactory method is to use a simple sonar instrument, not unlike a consumer grade fish finder, to find water level in the well. Certain environmental factors, like temperature, casing pipe material, well straightness, depth, and obstructions can render these devices inaccurate, so they are not as popular as mechanical tapes. In yet another previously recognized approach, contractors often carry a well level device that includes a moisture sensor at the end of a measuring tape that is temporarily inserted into a well and which makes a sound when it touches water, indicating the distance to the water. This technique is known to be reliable and inexpensive, but like the other previously described techniques, it is only designed for the well contractor's use to take one reading at a time, and to not log data or spot trends without repeat visits and manual collection, which is impractical and rarely happens.

A disadvantage of these previously recognized approaches is that due to water levels in the ground being dynamic, the data acquired is quickly dated and inaccurate once the technician completes the test. There is virtually no ongoing monitoring of safe yields of the well's water level. Additionally, users do not know if they are using more water than they should until it is too late. One common indication of overuse is that the pump fails due to dry run, indicated by a lack of running water from faucets or to toilets or appliances. Failures caused by overuse can be very expensive to repair, ranging in price from thousands of dollars to replace a pump or clear a well, to tens of thousands of dollars to dig a deeper well. In some cases, systemic overuse by many consumers in a region can even tax the ground water to the point of concentrating pollution or even running everyone's well dry. Homes in areas where there is severe water risk can quickly lose value.

On higher capacity, higher criticality water wells owned by water municipalities and some high-use agriculture businesses, water elevation information is collected continuously with pressure sensors mounted in the well under the water level connected to data logging equipment at the surface. Data provided by these devices is vital for controlling flow and therefore system performance. So a pressure sensor is part of a larger SCADA (Supervisory Control and Data Acquisition) system that keeps water flowing continuously. But these devices are expensive to install and maintain and may be part of a larger control network and scheme so they are not suitable or economically viable for homeowner or intermittent farm or business use.

When commissioning or repairing a well, a well driller may also perform a "pump test" to determine the ideal location for the pump. Using a sacrificial test pump, the well driller tests the pumping level and drawdown of the well, that is, the changed water elevation while the pump is running at its target capacity. The process involves installing the sacrificial test pump in the well deep under the static water level and running it at a flow rate equal to the anticipated peak demand of the well. When water is pumped to the surface, the water level in the well drops dramatically at first, and then the rate of decline begins to decrease until the pressure created by the water table equals the pressure created by the pump and groundwater runs into the well at the same rate that the well pumps water to the surface. The level of the water at which the pressure created by the water table equals the pressure created by the pump is the ideal vertical position of a pump in the column. Of course, the ideal vertical position of the pump at the time of commission or repairing may not be the ideal vertical position in a day, a month, or even years after the pump test is performed. However, because performing pump tests as described are costly and time intensive, they are not performed until repair is needed.

Finally, whereas in the recent past, sparse rural population, stable weather and slower agricultural and economic development did not threaten the natural recharge capabilities of most groundwater sources, today, population, overconsumption and climate changes have begun to tax the groundwater resource measurably. Hydro-geologists call this "unsafe yield." So water wells constructed a few years ago based on a groundwater elevation measured at the time are not able to produce as designed, and often fail prematurely.

As discussed, monitoring groundwater elevation continuously in residential and agricultural wells is becoming more important, but existing monitoring solutions are not effective. Measuring with a tape continuously is impractical and will always only be for one time use (a snapshot taken at one moment). Measuring with inaccurate sensors does not yield usable information. Outfitting intermittent use wells with pressure sensors and control networks is not cost effective or even necessary. Smart operations methods and an understanding of trends are needed as conditions change.

What is needed therefore is a device that allows monitoring of the well's water level on a continual basis. What is also needed is a way to monitor the well's water level preferably without repeated removal of the well head. Further, what is needed is a way to retrofit existing wells with a device that continuously monitors the well's water level preferably without repeated removal of the well head. Heretofore, these requirements have not been fully met without incurring various disadvantages.

SUMMARY

The present invention relates to a well head water level sensing system that allows continuous monitoring of water level in a residential well. The well head water level sensing system includes a signal generator, a triggering circuit, a tunable listening device, environmental (e.g., temperature and/or humidity) sensors for calibration, a clock, a secondary listening sensor for timed or provoked events, a data logger, and power and communication circuits. The well head water level sensing system relies on the sonar effect and the inherent resonant frequency of a tube to estimate the distance from the signal generator to the water level in the well.

An alternative embodiment of the invention is a water level sensing device having a simple, solar-powered sensor and communication module that gathers information about the level of water in a borehole-style water well and sends the information to a database that a homeowner can access via a computer, handheld device, or smart phone. The water level sensor tracks the level of water in the well, how it changes over time, the pace of recharge (water replenishment from the groundwater source), and can be programmed to send alerts to interested parties when user-predetermined thresholds are reached. The water level sensor and a website enable a well owner to use water mindfully within safe yield, and can help prevent costly water or well shortages, equipment failures, or other emergencies.

The water level sensor can preferably be attached to the exposed well head by a handy homeowner using a few common tools. In some applications, only a replaceable battery is required to power the sensor. And in others, power can be harvested from existing power wiring, without connections, using a current transducer and a power monitoring circuit. And in others, a photovoltaic cell affixed to the sensor or, optionally, on a flexible wand to raise the solar cell, charges and recharges a battery which powers all functions. A sensor is installed just inside the existing well cap, through vent holes that may be in the existing well cap, or within a new, replacement well. The data it collects is compiled in memory and sent to a database, where it is stored and analyzed.

The water level sensor may be easily paired to a computer network or common smart phones using any suitable communications technology such as Bluetooth, a cellular network, a local area radio network, a satellite network, or networked wirelessly via a common home wireless router connected to the internet. Once connected, data from the water level sensor is semi-continuously, or as programmed, delivered to a secure database. The homeowner can download a smart phone or tablet application with which to view and analyze the information about their well, or they can log onto a website to view the same data along with longer term trends. Warnings can also be sent to the homeowner, or to a well servicer they assign, when calculated trends predict problems including, but not limited to low water levels or reduced well productivity. With this information, well owners can avoid expensive surprise service visits, plan for less expensive regular maintenance, will see and be able to account for an unsafe yield or other consumption or renewal risks, will understand how their water use impacts their property and the water supply, and can advocate with others in the community to use water more sustainably.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
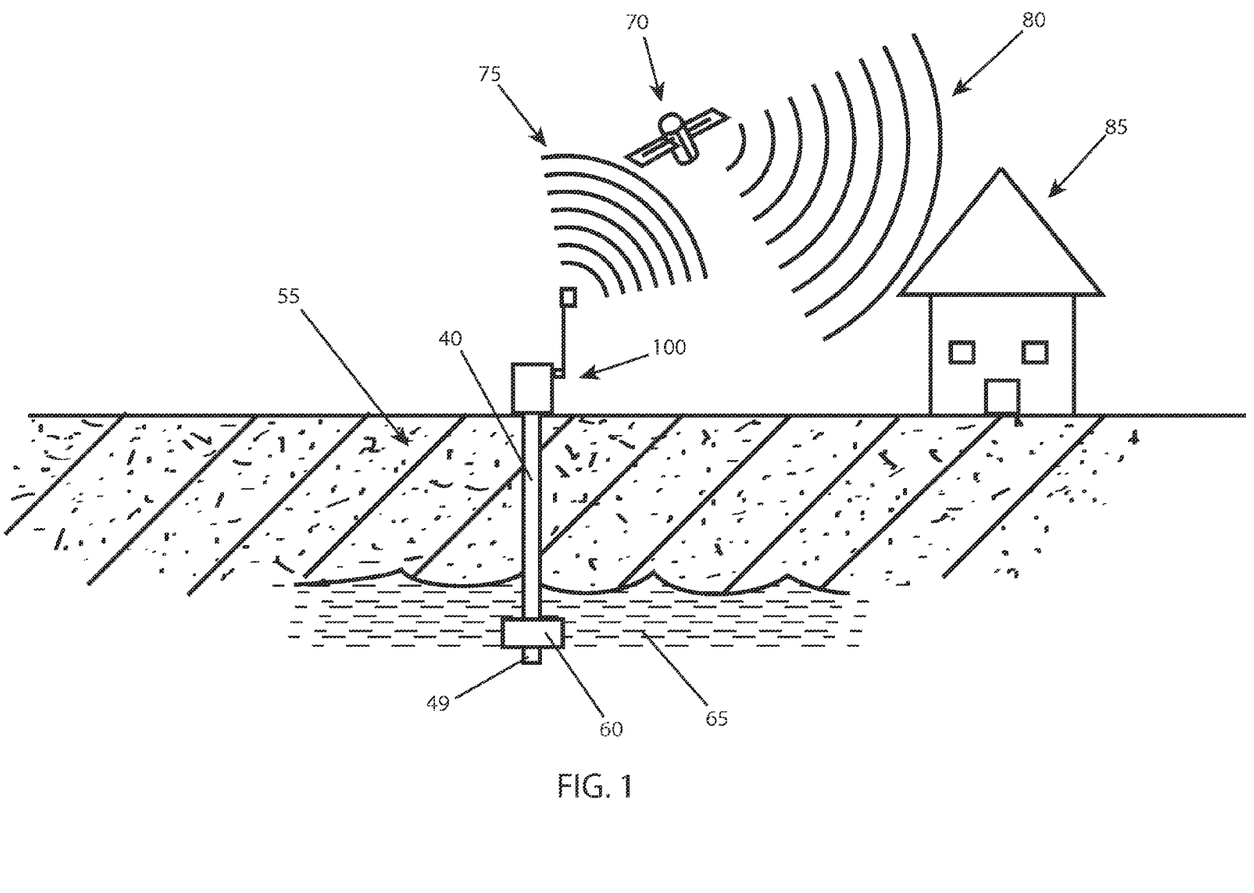
FIG. 1 is a schematic view of one embodiment of a water level sensing system in accordance with the invention.

Referring first to FIG. 1, a water well includes a casing pipe 40 inserted into a borehole in the earth. The borehole is drilled deep enough to encounter ground water 65. A pump 60 is lowered into the casing pipe 40 and is submerged under water 65. The casing pipe 40 includes a screen 49 for screening out sediments through which water 65 seeps. An integrated supply water pipe 50 as shown in FIGS. 2-4, supplies water from the pump 60 to any location, which may include a home.

Figure 2:
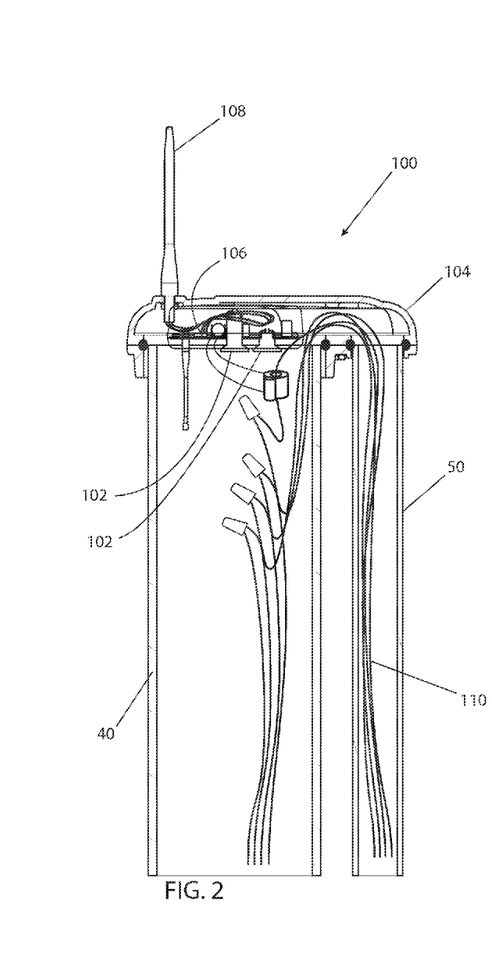
FIG. 2 is a section view of one embodiment of a water level sensing device in accordance with the invention.

Turning now to FIG. 2, a well head water level sensor 100 for a well in a region where there is a frost line is shown. The well head water level sensor 100 has cap-integrated sensors 102. In the embodiment shown, the standard well cap is removed and a new well cap 104, including the aforementioned sensors and other components is installed in its place. Electronics 106 are housed inside the well and under the well cap 104, apart from antenna 108. A data port and access to a battery for replacement are provided as well. A solar cell and/or other power supplies could also be used. Signals to the aforementioned components pass via wires 110 that lead through a sealed hole in the cap.

Figure 3:
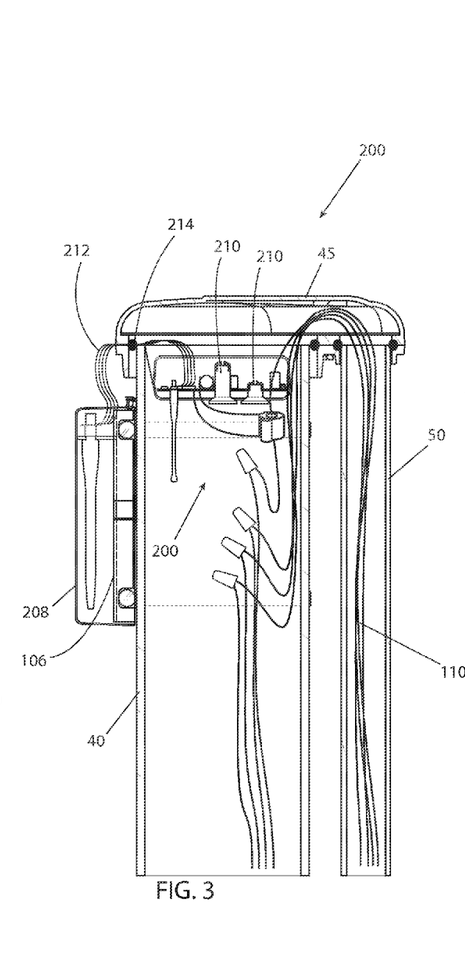
FIG. 3 is a section view of another embodiment of a water level sensing device in accordance with the invention.

Turning now to FIG. 3, a well head water level sensor 200 for a well where the existing well cap 45 cannot be replaced is shown. In this embodiment, the well head water level sensor 200 is attached to the underside of the existing well cap 45 using any suitable means, e.g. screws, adhesive, etc. External electronics 206 are housed outside of the casing pipe 40 in a rugged box 208 attached to the pipe. Communication between internal sensors 210 and external electronics 206 is made via flat, durable ribbon cable 212 that passes across gaskets 214 without breaking the mechanical seals between the casing pipe 40 and the cap 45. Other communication means between the internal sensors 210 and the external electronics 206 may also be used, e.g. wireless communication.

Figure 4:
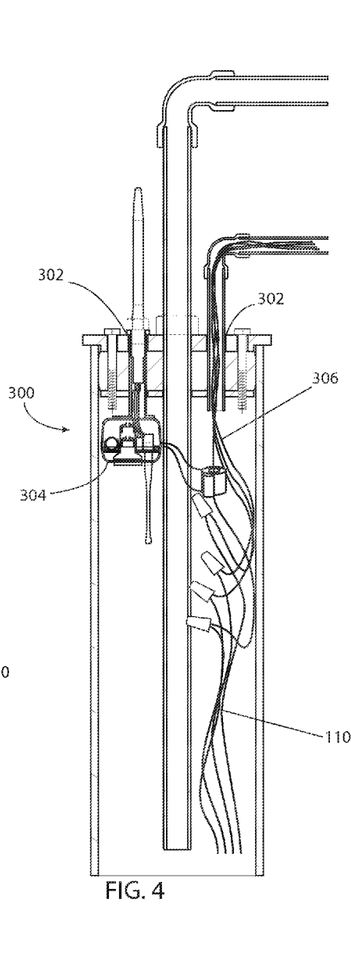
FIG. 4 is a section view of another embodiment of a water level sensing device in accordance with the invention.

Referring to FIG. 4, a well head water level sensor 300 for a well in a region where there is no risk of freezing is shown. The well head water level sensor 300 utilizes a vent hole 302 common in well caps found in these regions, and will act as a seal for the hole. As shown, electronics 304 are housed inside the casing pipe 40, but may also be attached above the well cap outside the well. The vent hole 302 acts as an access port and conduit for signal and power wires 306 and mounting hardware.

A well head water level sensor for a well and its related components may alternatively be placed on the outside of the casing pipe 40 or on top of the well cap 45. In this configuration, sensors may be attached to the existing well hardware and is configured to be able to gather information through that hardware.

Figure 5:
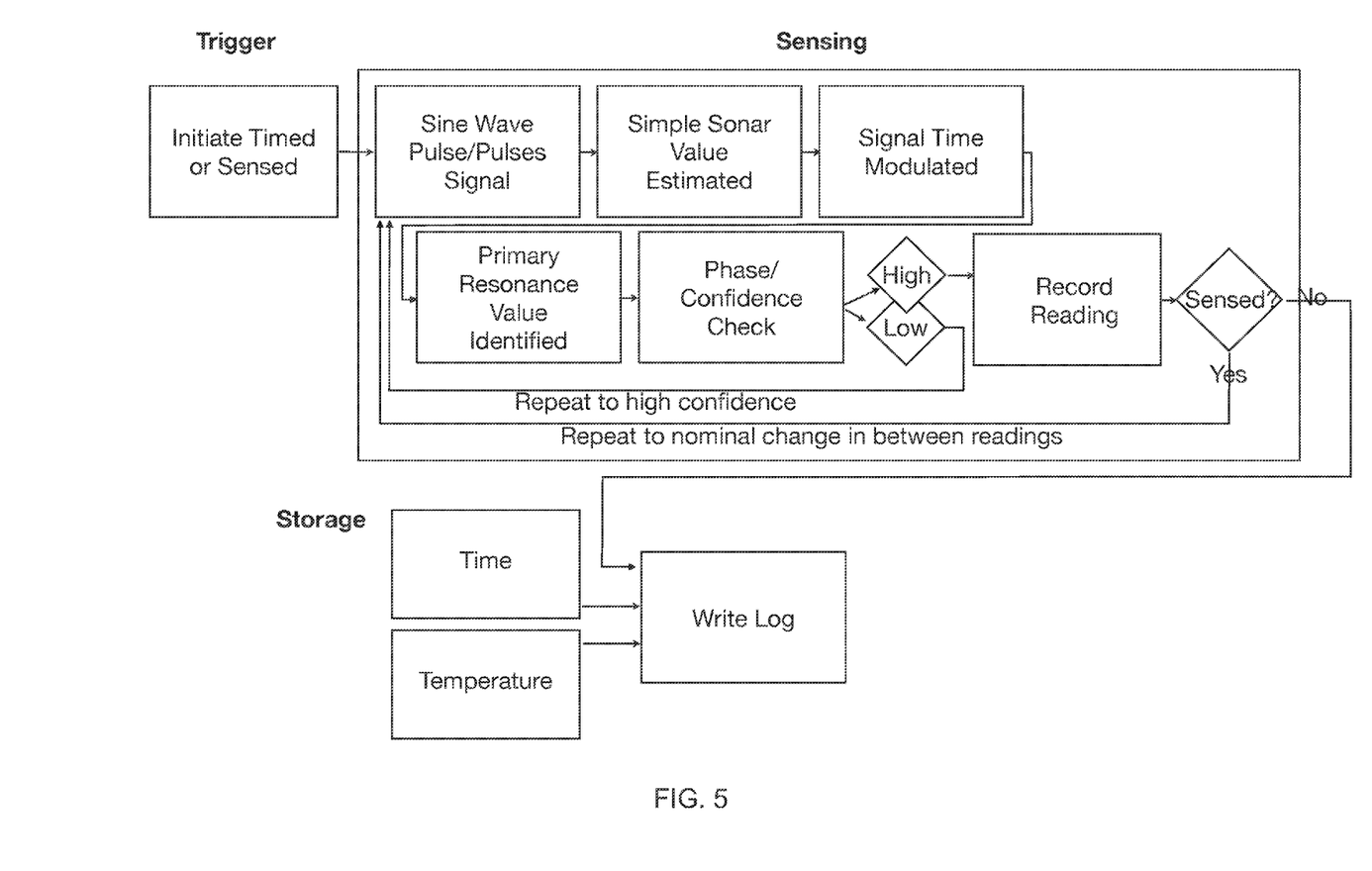
FIG. 5 is a flowchart of the operation of one embodiment of a water level sensing system in accordance with the invention.

As shown in the flowchart of FIG. 5, the embodiments shown in FIGS. 2-4 overcome the drawback of conventional acoustic water level sensors that make a sound and listen for the echo and time the period to calculate distance, by providing an adaptable sensor that is reliably accurate across a wide range of well configurations. The embodiments shown in FIGS. 2-4 all include the same components, but vary in how the components are packaged and placed on the well. Each well head water level sensor 100, 200, 300 includes a micro-processor controlled signal generator 102, a triggering circuit 104, a tunable listening device 106, environmental sensors 108 that measure temperature and/or humidity and help calibrate the water level sensor, a clock, a secondary listening sensor for timed or provoked events, a memory for logging data, and power and communication circuits.

The well head water level sensor 100, 200, 300 relies on two physical phenomena to gather information: 1.) the sonar effect to estimate distances to surfaces, and 2.) the inherent resonant frequency of a tube to help distinguish between obstructions, friction, bends and curves, and the actual water surface. This phenomenon can be observed in any wind instrument or pipe organ: a tube of a given length will resonate at a given frequency. By combining these two functions in the well head water level sensor 100, 200, 300, it can be made from common, albeit modern, and therefore capable and small components, and be placed at the top of the well, rather than in the water, and be highly accurate across a wide range of well sizes, shapes and configurations.

In the embodiments shown, the signal generator 102 generates a digitized low amplitude single pulse sine-wave sound (frequency is not a major factor in operation, but is determined by the limits of the signal generator, amplitude is determined by balancing well size and power consumption) and then listening. Many echo responses are heard, some larger and longer than others. Since wells differ, it is common for an echo created by an obstruction to be misinterpreted as water elevation, when it is not. For that reason, practitioners distrust basic sonar tools at worst, or consider them to be useful only for a low-resolution estimate. To improve the accuracy of the reading, the well head water level sensor 100, 200, 300 proceeds to a second step: reflections are analyzed for time, and the signal generator 102 responds by sending a new batch of single pulses, this time, coordinated at period identified by the largest reflection, which is assumed to be the natural resonant frequency of the distance of the tube from generator to the most complete obstruction, which in this case is the water surface.

If the timing is, in fact, the resonant frequency of the pipe distance to the water surface, the heard responses will begin to gain in amplitude. This occurs because the source pulse and the return echo are in perfect phase and reinforces the sound pressure level at the receiver. If this gain in amplitude phenomena is not observed, the signal generator 102 will alter its pulse timing to the next largest response, and so on. Once resonance is identified, it is confirmed by tuning the timing of additional pulses. As a confirmation to prevent a false positive occurring from some geometric feature of the well (or miscellaneous partial obstructions within the well), the source pulse timing is shifted to lag or lead 180 degrees in time relative to the source sound wave frequency. If the prior assumed resonance pulse timing that caused a gain in amplitude is the actual echo from the water's surface, the amplitude of pulses at the receiver will decrease significantly due to the source pulse and the echo canceling each other and thereby reducing the sound pressure at the receiver. The lowest pulse timing that causes these to conditions to occur, can only be the true resonant frequency of the well.

Because the well head water level sensor 100, 200, 300 performs a series of tests to find both sound reflections and the well's resonant frequency, the sensor, when working in sync with other connected computers, can be accurate in and adapt to nearly any drilled well environment.

The information gathered by the well head water level sensor 100, 200, 300, can be further refined through several techniques. The refined information improves the accuracy and increases the value of the information reaching the end user of the well head water level sensor 100, 200, 300. The following techniques may be used partially, in combination, or in total.

First, a variable digitized frequency modulated acoustic signature of sufficient and appropriate amplitude, frequency and frequency range from start to finish of the signal can be generated by the well head water level sensor 100, 200, 300. The variable digitized frequency modulated acoustic signature increases the accuracy of the information because the echo returned to the sensor is distinguishable even in the presence of acoustic noise obstructions or other audible noise which may be present in the well due to a running pump, falling water, or the like.

Second, the well head water level sensor 100, 200, 300 may adjust its signal strength based on the depth of the well. The depth of water in a well can be just tens of feet deep and in such cases the period of the signal must be tuned to be able to be recognizable in very short periods of time, such as a few milliseconds. Since the depth of water in a well can also be thousands of feet deep, the strength of the signal must be able to be tuned to be able to travel across long distance. The well head water level sensor 100, 200, 300 is able to judge approximate distances and vary its signal strength accordingly.

Third, the well head water level sensor 100, 200, 300 may parse out reliable information from the return signals of a variable digitized frequency modulated acoustic signature. The frequency modulated signal is delivered into a well from the well head water level sensor 100, 200, 300 and returned by the water or obstructions in the well. By listening to the return signals of the variable digitized frequency modulated acoustic signature, useful return signals are parsed out as a legitimately generated return signals and therefore worthy of additional scrutiny. This is accomplished by a computer which runs an algorithm to parse the return signals and then identifies in the return signals, using a probabilistic fitness score, the most likely return signal characteristics representing the time of flight between signal generation and return signal that can be assumed to be from the water surface and not from an obstruction or other noise. However, this information is only indicative. Additional factors must be applied for confirmation. This information is further refined for conversion to water level, compensated for temperature and then displayed.

Fourth, a comparison of historic measurements with current information increases the accuracy of the water surface's location in contrast to other things that might create inaccurate measurements. The comparison of historical measurements enables a constant calibration and recalibration of the device to ensure continual accuracy. This technique allows for acoustic data to be plotted on a time series chart and automatically analyzed by a computer on the network. As an example of this technique, information suggesting the presence of fixed or non-moving objects or noises in the well is isolated from the moving object, which must, by process of elimination, be the water surface shifting with time in response to in-well and water table or aquifer fluctuations. Using these insights, the well head water level sensor 100, 200, 300 automatically recalibrates to pinpoint and track the moving object and confirm the accuracy of the well head water level sensor's 100, 200, 300 readings without requiring physical confirmation.

Fifth, a comparison of data from other well head sensors in the geographic region with information from the well head water level sensor 100, 200, 300 may be plotted on a time series and geographic chart and automatically analyzed by a computer on the network. In this mode, the computer the network analyzes readings from more than one well head water level measurement device in a geographic region, normalizes the acoustic data to elevation, using location data provided manually or automatically, and deems readings outside of a reasonable range to be unfit based on the readings taken from nearby sensors.

Sixth, the well head water level sensor 100, 200, 300 may compensate for additional noises that might be present in the well, such as a running pump or falling water. The well head water level sensor 100, 200, 300 compensates for additional noises by identifying, either with a microphone, a power line mounted current transducer, or a flow or vibration sensor, additional noises and adjusting its own signal accordingly, to have the best chance of delivering a suitable signal for an accurate reading based on the level of noises in the well. Adjustments may include increasing or decreasing amplitude, varying frequency or modulation rates, depending on the noises present.

Additionally, by tracking the noises in the well, specifically noise from a running pump, and tagging records accordingly, the water level information shared with stakeholders can be organized for greater accuracy based on need. Additionally, stakeholders are able to use the water level data in comparison with historical water level data and geographic information. The comparison can be tracked and displayed to the stakeholder in various ways including charts, maps, graphs, datasets, and the like. For example, scientists may want data that contains no information that is biased by the running of a pump, so only readings temporally distant from pumping events are plotted on charts and graphs. On the other hand, well servicers may prefer to know when and how often a pump runs, in order to assess pump life expectancy. In this case, continuous static or resting water level or pump run readings are presented. Without a well head water level sensor 100, 200, 300 that takes continuous readings, varies its behavior in the presence of noise, and catalogues the noise in a database, these valuable uses would be impossible.

The well head water level sensor 100, 200, 300 also includes an environmental sensor 108 because the speed of sound in the air is affected by the air temperature and relative humidity. The environmental sensor 108 includes a temperature reading device 110, positioned at a location accounting for variations in surface and deep depth temperatures, and providing information to adjust final water depth calculations.

As a final check of data integrity after initial power up, readings are compared before and after a pumping event signaled by the triggering circuit 104. If no change in time response data is observed, the device will assume that it is not seeing the variable water surface, but a permanent obstruction, and will recalibrate to the next most likely response signal. Simple math is then used to calculate water elevation from sensed data, calibrated with readings from the environmental sensor 108, and a log of time-stamped readings is assembled and made ready to be shared.

To enable semi-continuous monitoring of a water well, it is necessary to position the sensors 102, 108 in such a way that they can see into the well while not needing to open the well or expose the water to open air or contamination and to leave them there, to operate over months and years. Additionally, its work must be done and information collected and accessed or transmitted at the surface without special tools or connections. The embodiments shown in FIGS. 2-4 are designed to either replace an existing cap or utilize existing vents and access points without leaking or altering normal operation of the well.

Figure 6:
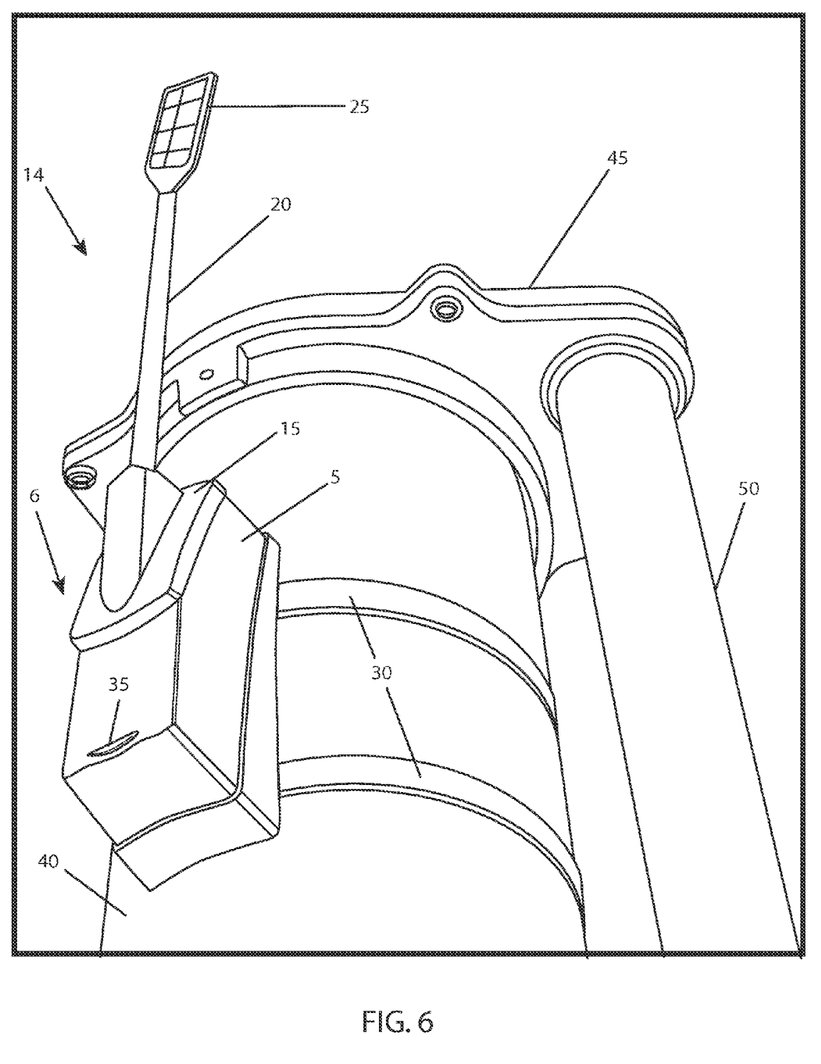
FIG. 6 is a perspective view of another embodiment of a water level sensing device in accordance with the invention.

FIG. 6 shows another embodiment of a well head water level sensor 6 in accordance with the invention. A well head water level sensor 6 is attached to the external side of the casing pipe 40 with the use of clamps 30. Of course, well head water level sensor 6 may be attached to the casing pipe 40 by any suitable means. In the embodiment shown, well head water level sensor 6 may be retrofitted on an existing well without removal of the well head 45 and without drilling into the casing pipe 40 or the ground. Well head water level sensor 6 contacts the casing pipe 40 on an external side of the casing pipe 40 and is held in place with the compressive force of the clamps 30. In an alternative configuration, well head water level sensor 6 may be attached to the top of the well cap 45, rather than being mounted to the side of the well pipe 40. Well head water level sensor 6 transmits a sensing signal that may be in the form of an acoustic signal into the body of the casing pipe 40. Well head water level sensor 6 is waterproof and impervious to high humidity levels. The solid construction renders well head water level sensor 6 tamper and vermin-resistant.

A transmission device within well head water level sensor 6 transmits the computed ground water level to a wireless network which may be a cellular network, a satellite network, or any other suitable wireless network. The wireless network may then relay the computed ground water level to a globally accessible network 70 which may include the Internet, the World Wide Web, or any other known globally accessible network. A handheld device which may include a smart phone, a tablet computer, a pager, or any computer that has access to the globally-accessible network 70 may then download 80 the ground water level information from the water well and display the ground water level information in any form, including a graph. Well head water level sensor 6 may be programmed to periodically transmit a data set which may include the ground water level to the wireless network.

Well head water level sensor 6 is shown with a whip module 14 that includes a shaft 20, a solar panel 25, and a base plate 15. As shown, a light emitting diode 35 indicates whether well head water level sensor 6 is functioning properly. The light emitting diode 35 may also be programmed to flash or change color to indicate warnings or to indicate any programmable message.

Figure 7:
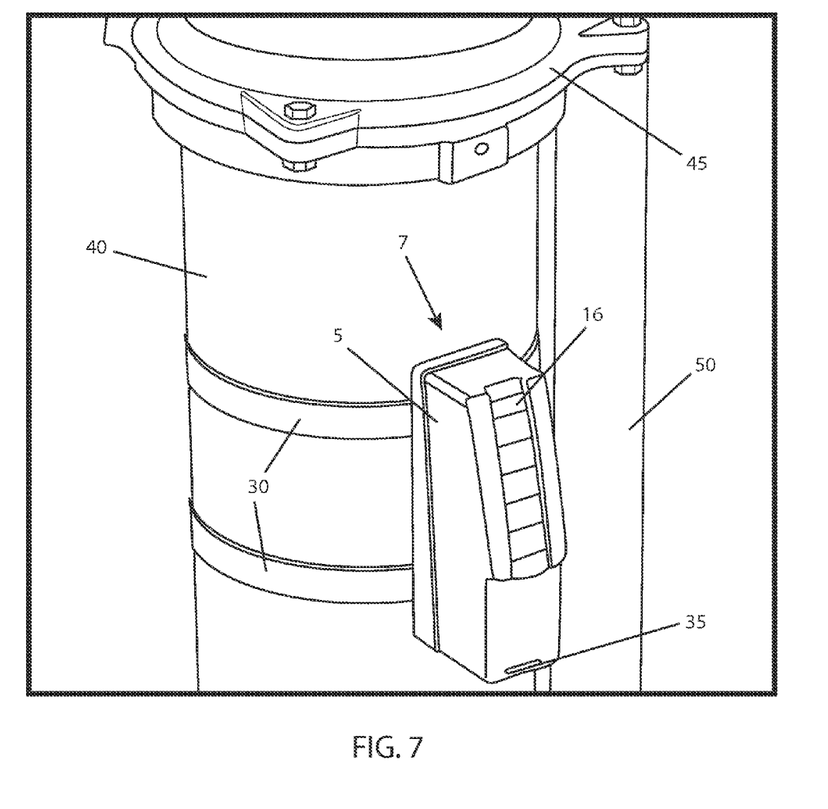
FIG. 7 is a perspective view of another embodiment of a water level sensing device in accordance with the invention.
Figure 8:
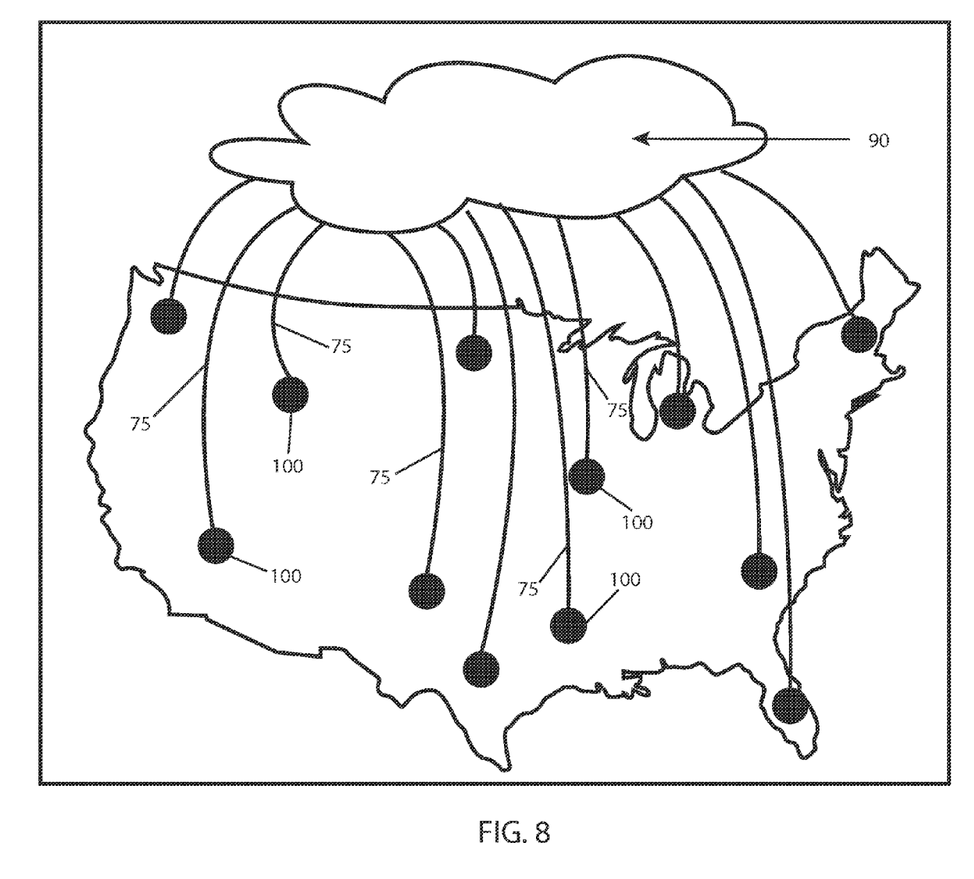
FIG. 8 is a schematic view of a communication system.

Referring to FIG. 7, another alternative embodiment of a well head water level sensor 7 is shown. Well head water level sensor 7 functions exactly as previously described well head water level sensor 6 except that a solar panel 16 replaces the whip module 14 and is attached directly to the front cap 5. Well head water level sensor 7 may be beneficial to use when the well head 45 has an unobstructed view of the sun at all times of the day. In certain applications well head water level sensor 6 may more advantageously generate electricity for the well head water level sensor 6 through use of the whip module 14 where there is tall grass, shrubs, trees, or snow that may potentially block sunlight from reaching solar panel 16. The shaft 20 of the whip module 14 may also be constructed of any suitable length that allows the remote solar panel 25 to have an unobstructed view of sunlight. FIG. 6 discloses both the solar panel 16 and the whip module 14, which as mentioned above, are interchangeable.

Turning back to FIG. 1, a well head water level sensor system is shown. As described previously, the well includes a well head 45, a casing pipe 40 inserted in a bore that is drilled through the ground 55, and a well pump 60 that is submerged in the ground water 65. A screen 49 filters out sediment and allows the ground water 65 to seep through to the well pump 60. The well pump 60 pumps water from the well to the surface for use in a home 85. The well head water level sensor system transmits a signal 75 indicating ground water level to the globally accessible network 70. While FIG. 1 shows the globally accessible network in the form of a satellite, the network may also be a cellular tower, the Internet, a WiFi connection or any suitable network.

There is no limit as to how many water wells may be equipped with the water level sensor system. As shown in FIG. 10, a central cloud server 90 may have access to the globally accessible network 70. The cloud server 90 may be in communication with and be reached through the globally accessible network 70. The cloud server 90 may compute all the transmitted signals 75 from wireless devices 6 around the country, or potentially around the world, and compute future trends of water levels in various wells. There is no limit as to what the cloud server 90 may compute with the transmitted signals. A few examples of information that may be computed by the cloud server 90 are warnings when water levels in wells fall below a predetermined threshold, warnings when predicted water levels fall below a predetermined threshold, graphical charts indicating the history of water levels, and consumption rates of water in various water wells. Homeowners or technicians may then be kept informed about the water level in their respective wells regardless of their location by accessing the globally-accessible network 70 and downloading 80 information about their water well for display on any suitable device.

The well head water level sensor system can also warn of a predicted water shortage or that the water level is predicted to fall below the pump's depth. Such a warning may afford the homeowner ample time to contact a technician to service the well prior to experiencing water shortages. Pump manufacturers or technicians may also be contacted prior to experiencing water shortages automatically. This would potentially allow for homeowners to have the well and pump serviced automatically. Municipalities and water regulatory agencies may also be granted access to the central cloud server 90, allowing them to monitor ground water levels across the country.

In all of the previously described embodiments, the sensor system is connected with a communication module for accessing the data, including, optionally, a wireless or radio transmitter, a bluetooth transmitter, a satellite telephone or a USB access point or any other means of communication. Power is accessed via a current transducer or an alternate source, like a battery or solar cell mounted outside of the system.

With semi-continuous logging of well elevation information in a well, it is possible to replace a the procedure known as "pump-level testing" or "pump testing", without having to send a technician to the well location, open the well, or wait until failure signals a problem. Furthermore, a well expert or someone interested in well health (like the owner) can monitor healthy pump location, levels and operation, see trends, anticipate change, and even take preventive action to maintain safe pump levels.

To accomplish this work, sensors located on the well must be connected to a communication network. One sensor listens for and monitors pumping events and triggers a second sensor that measures water elevation. A clock keeps time, triggering routine static water levels to watch for changes unrelated to pumping, and measures recovery time. A computer or mobile device interface displays the results of water measurements taken with every pump run. Software distinguishes between events of high flow (and therefore suitable for pump level diagnostics) and low flow, and allows users to use information for various problem solving possibilities, like alerts, remote diagnostics or pre-emptive service dispatch.

Once such sensors are deployed, a network can be established and well data is aggregated, multiple well assets can be managed more effectively. For example, a well service company can offer pump level adjustment as a preventive service, in lieu of more expensive repairs following catastrophic failure. A farmer might more closely monitor or manage an array of wells serving pivot irrigation systems focusing limited upkeep budgets on the neediest wells, or an agricultural management contractor might be able to use water elevation and pump level data to determine the location of future plants and crops.

The well head water level sensor 100, 200, 300, 6, 7 is designed to be installed and forgotten. The photovoltaic cell is large enough to provide power for full operation during the day. The battery provides enough power for night time operation, and for extended periods of cloud cover. In the embodiments shown, the battery life is approximately 5 years, when used in a well with a depth of approximately 100 feet and approximating other power consumption variables. Of course, other batteries or power supplies may be used to accommodate wells of different depths or any other reason without departing from the invention. The housing is waterproof, tamper-proof, vermin-proof, and durable enough to withstand small contact with branches, weeds, or a passing lawn mower. An optional solar wand may also be used to extend the height of the solar photovoltaic cells, accounting for deep snow, or bush and plant growth.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A method of measuring and tracking water level in a plurality of water wells over time, each of the water wells having depths and including casing pipes with well heads including water level sensors attached thereto, each of the water wells further including pumps for pumping water from below ground level, the method comprising:
   providing signal generators positioned in each of the plurality of well heads, the signal generators providing source pulse signals having amplitudes, frequencies, and modulation rates, wherein the source pulse signals reflect off of at least one surface in each of the plurality of water wells, thereby resulting in echo response signals;
   sending the source pulse signals semi-continuously;
   sensing the echo response signals using the water level sensors;
   parsing the echo response signals to identify which one of the echo response signals is the most likely distance from each of the well heads to the water level in each of the plurality of water wells;
   designating the distance measurement from each of the well heads to the water level in each of the plurality of water wells as water level data;
   transmitting the water level data to and storing the water level data in a database;
   measuring a well elevation of each water well, wherein the well elevation is the distance from ground level to sea level elevation; and
   normalizing the water level data obtained from each well head sensor to sea level elevation by calculating the difference between the well elevation and the water level data to obtain normalized water level data.

2. The method of claim 1, wherein the source pulse signals are digitized low amplitude single pulse sine-waves.

3. The method of claim 1 further comprising the step of adjusting the source pulse signal strength based on the depth of the well.

4. The method of claim 1 further comprising the step of calibrating the water level data based on historical data.

5. The method of claim 1 further comprising the step of varying at least one of the amplitude, frequency, and modulation rate to calibrate the water level data.

6. The method of claim 1 further comprising the steps of:
   analyzing the return signals, using a probabilistic fitness score, to identify a most likely return signal characteristics representing time of flight between source pulse signal generation and return signal receipt; and
   identifying at least one of the return signals as the resonant frequency to represent the time of flight between source pulse signal generation and return signal receipt that is based on a reflection from a water surface.

7. The method of claim 1 further comprising the step of comparing historical normalized water level data to current normalized water level data.

8. The method of claim 7 further comprising the step of displaying the comparison of historical normalized water level data and current normalized water level data on a graph.

9. The method of claim 7 further comprising the step of tracking the normalized water level data comparison over time.

10. The method of claim 7 further comprising the step of plotting historical normalized water level data.

11. The method of claim 1 further comprising the step of compensating for extraneous noises in the well.

12. The method of claim 1 further comprising the step of identifying when the pump is running by listening for a noise emitted by the pump.

13. The method of claim 12 further comprising the step of filtering out any water level data collected while the pump is running.

14. The method of claim 12 further comprising the step of filtering out only water level data collected while the pump is running.

15. The method of claim 12 further comprising the step of comparing water level data from before and after the pump is running.

16. The method of claim 12 further comprising the step of tagging readings taken while the pump is running.

17. The method of claim 1 further comprising the step of comparing normalized water level data in a geographic region.

18. A method of semi-continuously tracking water level in a plurality of water wells having depths and including casing pipes with well heads attached thereto, each of the water wells further including a pump for pumping water from below ground level, the method comprising:
   providing water level sensors in each water well to obtain water level data for each well;
   transmitting the water level data to and storing the water level data in a database;
measuring a well elevation of each water well, wherein the well elevation is the di stance from ground level to sea level elevation;
   normalizing the water level data obtained from each well head sensor to sea level elevation by calculating the difference between the well elevation and the water level data to obtain normalized water level data; and
   comparing historical normalized water level data to current normalized water level data.

19. The method of claim 18 wherein the plurality of water wells are located in a limited geographic region.

20. The method of claim 18 further including the step of refining the normalized water level data to measure fluctuations in the water table.

21. The method of claim 18 further including the step of refining the normalized water level data to measure fluctuations in the aquifer.

* * * * *